INVENTORS.
Richard V. Collins
John B. Sutherland
BY Thos. E. Scofield
ATTORNEY.

INVENTORS.
Richard V. Collins
John B. Sutherland
BY Thos. E. Scofield
ATTORNEY.

Jan. 1, 1963

R. V. COLLINS ET AL 3,071,061

STORAGE STRUCTURE

Filed Dec. 1, 1959

5 Sheets-Sheet 3

INVENTORS.
Richard V. Collins
John B. Sutherland
BY
Thos. E. Scofield
ATTORNEY.

INVENTORS.
Richard V. Collins
John B. Sutherland
BY Thos. E. Scofield
ATTORNEY.

INVENTORS.
Richard V. Collins
John B. Sutherland
BY
Thos. E. Scofield
ATTORNEY.

United States Patent Office 3,071,061
Patented Jan. 1, 1963

3,071,061
STORAGE STRUCTURE

Richard V. Collins and John B. Sutherland, Prairie Village, Kans., assignors to Butler Manufacturing Company, Kansas City, Mo., a corporation of Missouri Filed Dec. 1, 1959, Ser. No. 856,536
12 Claims. (Cl. 99—235)

This invention relates to the storage of materials and refers more particularly to the storage and protection from destruction of materials such as corn, silage, sugar and other materials or crops which, if allowed to remain exposed to contact with the atmosphere, suffer degradation to the extent that their usefulness is seriously impaired, if not completely destroyed.

Theoretically, it is possible to store and protect materials of the character described in gas-tight heavily reinforced storage structures capable of withstanding high pressure differentials, both positive and negative, between the inside of the structure and the ambient atmosphere. However, as a practical matter, such structures are not available to the average person interested in storage of such materials for one purpose or another. Among the many reasons for this are (1) the high cost of providing a strong enough wall to withstand pressure differentials inevitably involved as a result of the changes from hour to hour and day to day in the climatic conditions in the area where the structure is located; (2) the difficulty and accompanying high cost of providing pressure sealing around the necessary openings and between the component parts of the storage structure; (3) the high cost of shipping the massive structure involved, and (4) the inability of many erection contractors to have on hand the heavy duty erection equipment required to lift and properly position the heavy sections of the structure.

Recognizing these problems, efforts have been made in the past to provide an arrangement in such structures whereby expansion and contraction of the gas within the structure due to climatic changes is accompanied by an actual change of available enclosed space for gas. In some cases a portion of the enclosure is formed as an elastic expansible diaphragm which accommodates to the changes in pressure. In others, a so-called "breathing bag" is employed, the interior of the bag being in communication with the interior of the enclosure and capable of receiving the gas from the enclosure as expansion takes place. In both cases, however, the material of which the diaphragm or bag is constructed is subject to fatigue, loss of elasticity and decomposition at a greater rate than the metal storage structure, and further, it is virtually impossible to achieve a balanced condition of the diaphragm (non-stretched and capable of equal distention in either direction) or bag (half filled with gas) when the enclosure is finally sealed shut. Obtaining proper pressure-tight couplings and connections with the diaphragm or bag also presents difficulties.

One of the important objects of the present invention is to provide a storage structure having means for effectively inhibiting the interchange of gases within the structure with the ambient atmosphere under varying climatic conditions without, however, requiring any breathing diaphragm or bag. Broadly stated, the invention contemplates structure associated with and forming part of the storage structure and providing an elongate, narrow conduit having one end in communication with the interior of the enclosure and the other end arranged to communicate with the outside atmosphere. The volume and configuration of the conduit is such that it will prevent any appreciable quantity of outside air from passing therethrough to the extent of entering the enclosure when contraction due to cooling takes place within the enclosure, or when there is an atmospheric pressure rise, and will maintain a good degree of segregation between gases emanating from the interior of the enclosure and the outside air.

Another object of the invention is to provide a structure of the character described in which said enclosure comprises a relatively low strength metallic cylindrical tank having a superstructure forming a unique flow chamber which includes said conduit and which is co-extensive with the cylndrical configuration of the tank. According to this form of the invention the conduit is formed by a series of dividers or baffles radially arranged and forming an exceptionally long and narrow passageway for the travel of the gas either toward or away from the interior of the enclosure. A feature of the invention in this connection resides in the arrangement of the superstructure to include a filler opening for the enclosure which provides access to the interior for filling and inspection.

Another object of the invention is to provide a storage structure provided with a superstructure and flow chamber of the general construction described, but also formed to take advantage of the relative differences and densities of the gas generated within the enclosure and the outside air.

A further object of the invention is to provide a storage structure in which, in the alternative, said flow chamber and conduit is formed as a part of the foundation structure for the enclosure, thus making it possible to utilize conventional and readily available bolted tanks and the like as the enclosure, means being provided for communicating the gas from the interior of said enclosure to the flow chamber.

Still another object of the invention is to provide a storage structure having the features outlined above and provided with means for withdrawing the stored material without any substantial ingress of outside air.

Other and further objects of the invention together with the features of novelty appurtenant thereto will appear in the course of the following description.

In the accompanying drawings which form a part of the specification and are to be read in conjunction therewith and in which like reference numerals indicate like parts in the various views:

FIG. 1 is an elevational view of a structure constructed in accordance with the invention, parts being broken away and shown in section for purposes of illustration;

FIG. 1*a* is a continuation of the lower right hand side of FIG. 1 illustrating the outer end of the unloading mechanism;

FIG. 1*b* is a fragmentary view, on a reduced scale, showing the inclusion of a two way pressure relief valve in the structure of FIG. 1 at the inlet to the conduit from the tank;

FIG. 1*c* is a fragmentary view, on a reduced scale, showing the inclusion of a two way pressure relief valve in the structure of FIG. 1 at the outlet from the conduit to the atmosphere;

Figure 1:
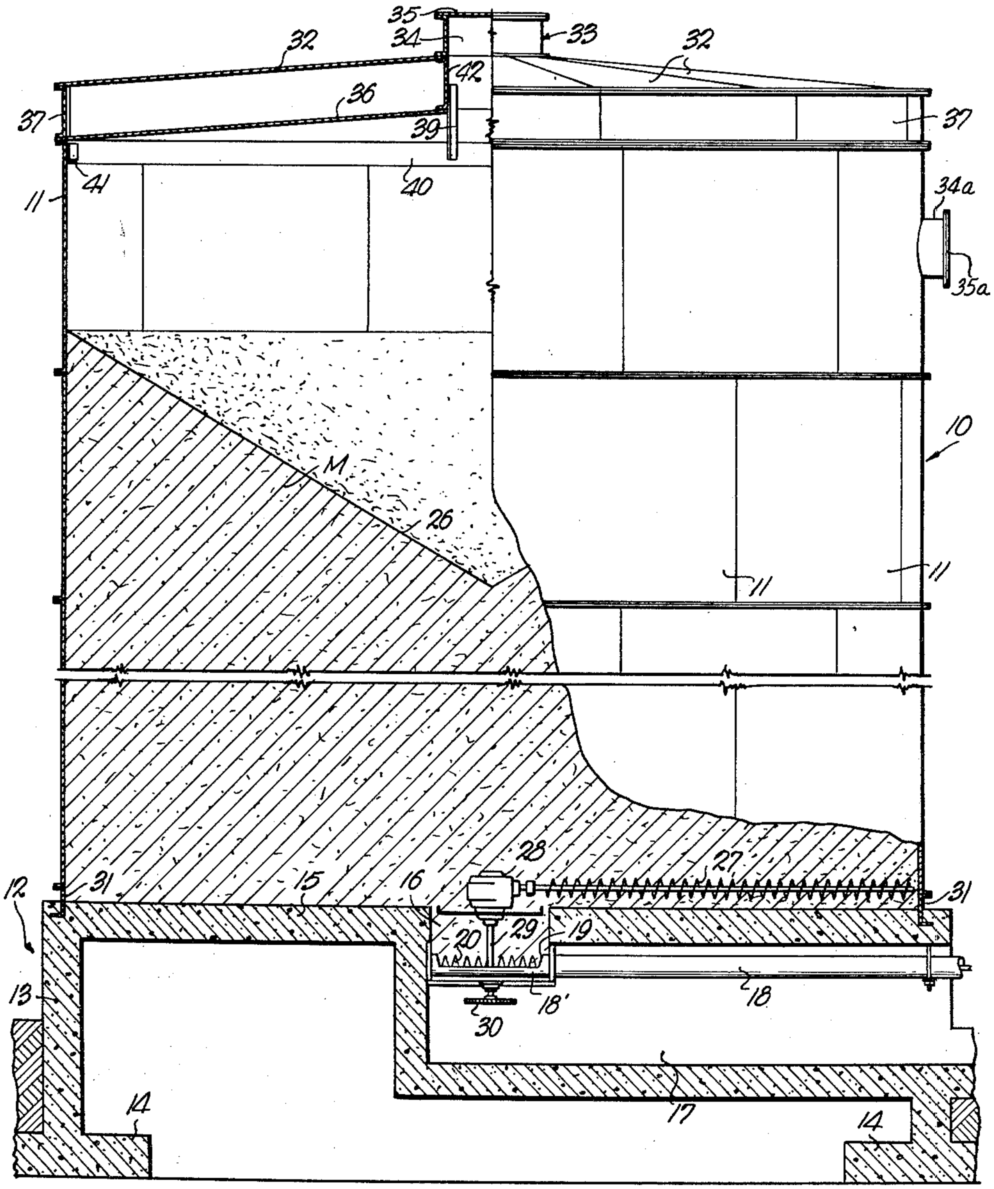

Referring now to the drawings, and initially to the embodiment of the invention shown in FIGS. 1 through 5, inclusive, the storage tank structure is represented generally at 10. In its preferred form this conventionally comprises a cylindrical tank-like structure built up of bolted sections represented by reference numeral 11. The bolted connections are not shown since they are conventional. It will be understood that at each joint sealing or calking materials are supplied in order to render the structure substantially gas-tight. The entire inner surface of the tank is lined with a suitable liner which will bond to the metal of which the tank is constructed, the preferred form of liner being one of the metal bonding epoxy resins which are known and used for coating metals.

The tank is preferably mounted upon a firm concrete foundation structure 12.

In the form of the invention here under consideration this foundation may take any one of several shapes, but conveniently it is provided with an annular vertical wall 13 supported on footings 14 and having a top deck 15. At its center the deck 15 is provided with an orifice 16 through which material can flow to a tunnel or trench 17 formed in the foundation. It will be noted that the tunnel 17 is covered by the top deck 15. Supported within the tunnel is a pair of side-by-side tube-type augers 18 which have portions 18′ directly beneath the orifice 16. The top of the auger tube of each auger 18 is provided with openings 19 beneath the orifice so as to permit material to flow into the tubes 18 and be engaged by the auger screw 20.

Figure 1A:
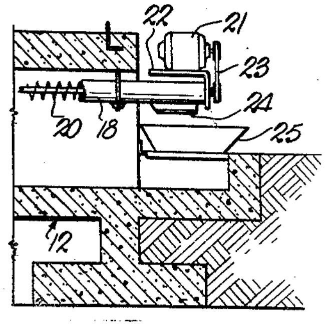

The screws 20 of the augers 18 are driven in any conventional manner, for example, motor 21 which is supported upon and drivingly connected with the screws adjacent foundation 12 as shown in FIG. 1*a*. Any suitable bracket 22 for supporting the motor may be employed. The motor can be connected with the auger screws by V-belt 23. As material is moved along the tube 18 by the auger 20 from the center of the structure to the outside, it is discharged through a spout 24 into a collecting hopper 25 from whence it can be taken by any suitable conveying equipment, for example, another auger with its intake and disposed in the hopper 25.

In the illustrated form of the invention we have shown the tank as being partially emptied, the conventional angle of the repose of the material M (which may be corn or the like) being indicated at 26.

To provide assistance in discharging the material from the tank when the normal flow resulting from gravity ceases, we have provided a sweep auger 27 which is connected by a right angle gear box 28 to a shaft 29 having at its lower end a sprocket 30. When it is desired to drive auger 27, a drive chain (not shown) is connected with the sprocket 30 and powered by a conventional type motor (also not shown) which will result in turning of auger 27. The auger 27 is of a type which will rotate around the bottom of the tank or enclosure as the resistance to rotation decreases, thus providing a means of sweeping the entire bottom clean.

It will be understood that the unloading mechanism of the invention, with particular reference to the sweep auger 27, plays no part in our invention except insofar as discharge through orifice 16 and tube 18 provides a structure in which the chance of air entering the interior of the enclosure is minimized. To assist in this purpose a cover ordinarily is provided for spout 24 to seal it shut at times when the unloader is not being used.

The tank 10 is preferably supported on the foundation by means of U-shaped annular footing rings 31 partially embedded in the foundation at the time it is poured, and thus firmly secured thereto. The tank is bolted to these footings, but since this is a usual practice in the construction of metal tanks, the details of the connection have not been shown.

Turning now to the top of the storage enclosure, the top wall is formed in the usual fashion by pie shaped plate sections 32 bolted together to form a slightly pitched roof. Preferably these sections terminate short of the center of the structure to define a centrally axial opening surmounted by an annular wall structure 33 which defines a passageway 34. Passageway 34 is normally closed by a cover plate 35 which can be bolted or otherwise secured in place.

Spaced beneath the top formed by plates 32 is a partition-like structure which like the top is formed of plates 36 connected together to provide a continuous barrier interposed between the top and the main storage section of the bin. The plates 36 can be of identical construction as the top plates 32, being supported at their outer ends on the uppermost tank plates 11 and firmly secured thereto. An annular wall section 37 coextensive with the wall of the tank serves to space the outer ends of plates 32 above the partition. The inner ends of plates 36 can be connected with vertical braces 39 which are supported on and secured to a horizontal bracing structure formed by crossbar 40 which extends diametrically across the inside of the tank structure and is secured to the tank wall as at 41. The plates 36 also terminate short of the center, being connected with an annular section 42 which forms a continuation of passageway 34 through the partitioned structure defined between plates 32 and 36.

Figures 2, 3, 4, 5:
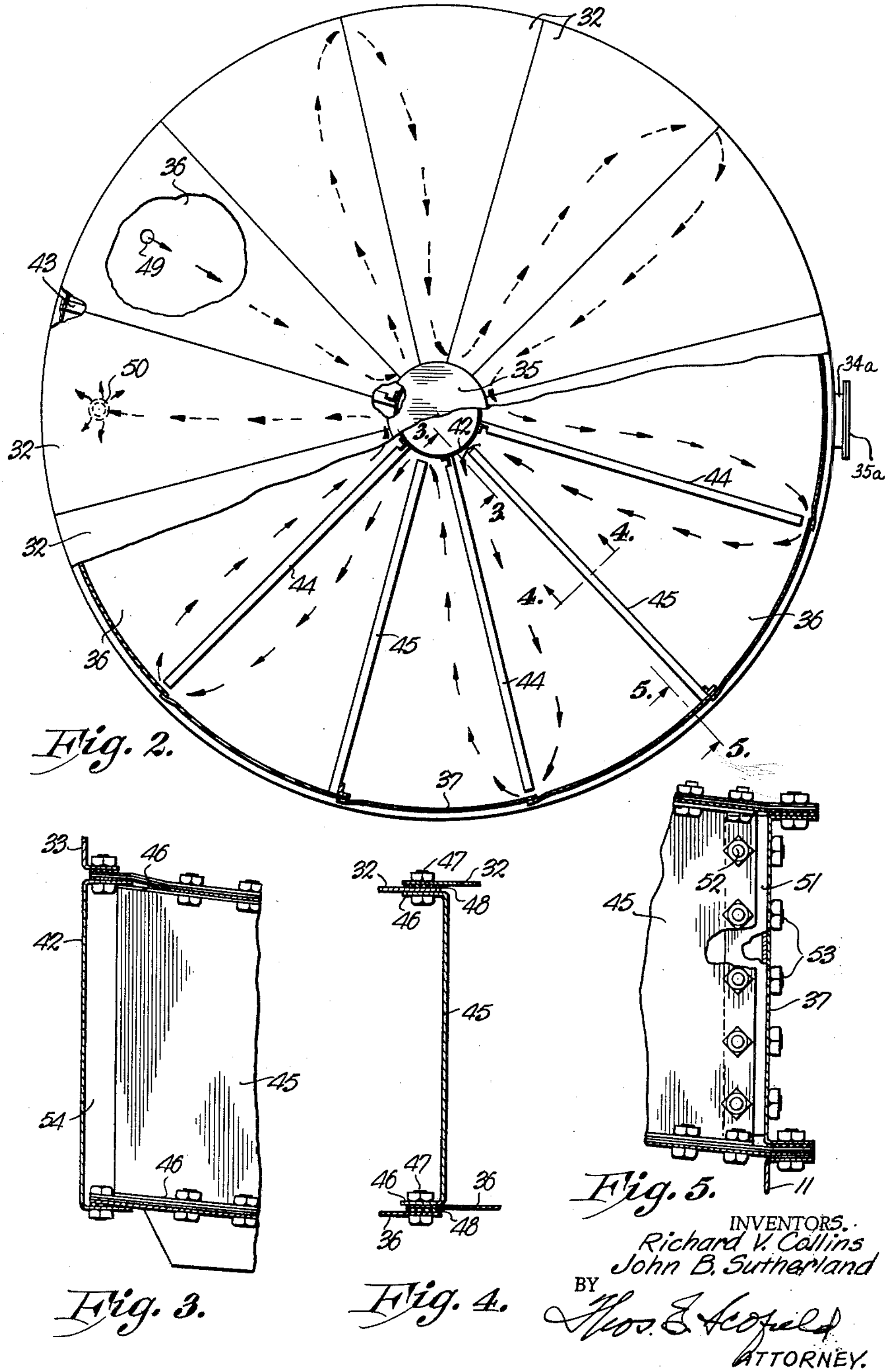
FIG. 2 is a top plan view of the structure illustrated in FIG. 1, parts being broken away for purposes of illustration.
FIG. 3 is an enlarged fragmentary view taken along the line 3—3 of FIG. 2 in the direction of the arrows.
FIG. 4 is an enlarged fragmentary section taken along the line 4—4 of FIG. 2 in the direction of the arrows.
FIG. 5 is another fragmentary sectional view taken generally along the line 5—5 of FIG. 2 in the direction of the arrows.

As is believed evident, the plates 32 and 36, together with the inner and outer annular wall portions 42 and 37, respectively, define a chamber or space segregated and distinct from the main storage space within the enclosure 10. This chamber or space is further broken up and compartmented by radial dividers which, for purposes of convenience, are identified at 43, 44 and 45. For purposes of illustration and as is actually the case in the preferred embodiment, there is a divider aligned with each joint between the plate segments 32 and 36 which form the top and partition, respectively. These dividers comprise thin air impervious members arranged vertically within the flow chamber, and, as will be explained hereinafter, extend substantially from the outer wall 37 to the inner wall 42. As best seen in FIG. 4, each divider is provided with a flange 46 at its upper and lower edge and this flange is bolted securely to the plates 32 or 36 by bolts 47 which serve to secure adjacent plates together. A strip of gasket material 48 is interposed in the bolted connection to provide the necessary sealing.

It is thus evident that the dividers 43, 44 and 45 cooperate with one another and with the partitions and top and the inner and outer annular walls 37 and 42 to provide a series of pie-shaped compartments extending around the inside of the chamber. As will now be described, these dividers are so disposed and so connected with the structure as to provide a long passageway of limited cross-sectional area between an inlet 49 to the chamber through a deck plate 36 from the interior of the tank 10 to an outlet 50 to the atmosphere through a top deck plate 32. Both of the apertures can be seen in FIG. 2 of the drawing.

The path described by gases which leave the storage tank 10 when greater than atmospheric pressures exist therein is illustrated by the arrows in FIG. 2. To achieve this path the baffles or dividers 44 and 45 are provided with openings staggered in relation to one another between the inside and outside of the chamber. As an example, reference is made to FIGS. 3 and 5, which show the detail of a baffle having the opening adjacent the inner wall 42. As will be seen in FIG. 5, the baffle 45 is connected directly to the outer wall 37 by means of an angle 51 having an inwardly extending leg to which the baffle is bolted by bolts 52 and a tangential flange which is connected to wall 37 by bolts 53. Thus gas cannot move past the baffle at this point. However, at the other end, i.e., that end adjacent wall 42, the baffle terminates short of the wall to provide a space 54 (see FIG. 3). This is true for each of the baffles 45 all the way around the chamber.

In the case of the baffles 44 the same manner of construction is employed except that at the inner end the baffle is sealed to the wall 42 while the gap is provided between the outer end of the baffle and the wall 37.

The baffles 44 and 45 are, of course, alternately located around the chamber. However, the apertures 49 and 50 are separated by a baffle 43 which is sealed to both of the walls 37 and 42 so that gas cannot flow directly between the two apertures. Thus, as gas is exhausted from the interior of the storage tank through aperture 49 it must follow the path charted by the arrows, proceeding first to the inner end of a baffle 45, then back out to the outer end of a baffle 44, and so on.

It will be evident that what in effect has been provided is a conduit of limited cross-section connecting the apertures 49 and 50. The conduit is, of course, of substantial length and volume, more of which will be said later.

In operation the storage tank or enclosure functions in the following fashion. Initially the tank is filled with the material to be stored through the filler passageway 34, or side entry 34*a*, the cover 35 or 35*a* having been removed. When the tank is filled to the desired level the cover is replaced. As the gas pressure within the tank rises (due not only to spontaneous generation of such gases as carbon dioxide and the like, but to gaseous expansion caused by high temperatures or by a drop in the atmospheric pressure) the gases tend to flow from the storage tank 10 through aperture 49 into the flow chamber. However, instead of being directly discharged into the surrounding atmosphere, these gases must follow the path defined by the arrows in FIG. 2 from one end of the conduit to the other. An interface zone separates the tank gases and the outside air and tends to move in accordance with the expansion or contraction of the gases within the enclosure. At times when there is expansion within the chamber or enclosure 10, this interface will move progressively toward the atmospheric outlet 50. When contraction takes place, or if a rise in atmospheric pressure develops, the interface will move back toward the aperture 49. By providing the tortuous path not only is the length of the conduit considerably increased, but the tendency of the gases to intermix is inhibited. Accordingly, entry of oxygen into the enclosure proper is effectively prevented so long as the flow chamber or conduit is properly dimensioned.

While the volume and length to be given the conduit will vary in accordance with the climatic conditions which are to be designed for, we have established as a lower limit an enclosed volume of not less than 1% of the volume of the entire tank and a length of not less than one-tenth the value of this enclosed volume. As a desirable volume range we recommend between 1% and 5% of the volume of the tank. Under the most extreme conditions that normally can occur in storage of this type, the higher end of the range will provide sufficient volume in relation to length as to avoid appreciable sucking of air into the main storage section.

As will be evident, the structure disclosed and described in connection with FIGS. 1 through 5 is immediately responsive to pressure changes inside and outside the tank, which means that at all times the pressure inside the tank will equal that outside the tank. This is an advantage in that it requires little effort to obtain a satisfactory seal at the joints between the tank plates, baffles and annular wall sections to prevent leakage. Moreover, the tank can be constructed of relatively light weight materials, the only requirement being that they be sufficiently strong to contain the material being stored. In addition, by providing the flow chamber superstructure at the top of the tank, the effect of the sun's rays on the material therein is somewhat reduced, the flow chamber providing an insulated barrier between the top deck plates 32 which are struck directly by the rays of the sun and the material storage section. The baffles and their interconnection with the top structure of the bin likewise increase considerably the structural strength of the top of the tank, making it possible to place less emphasis on lateral stress considerations in the design of the tank wall proper 10.

Figure 6:
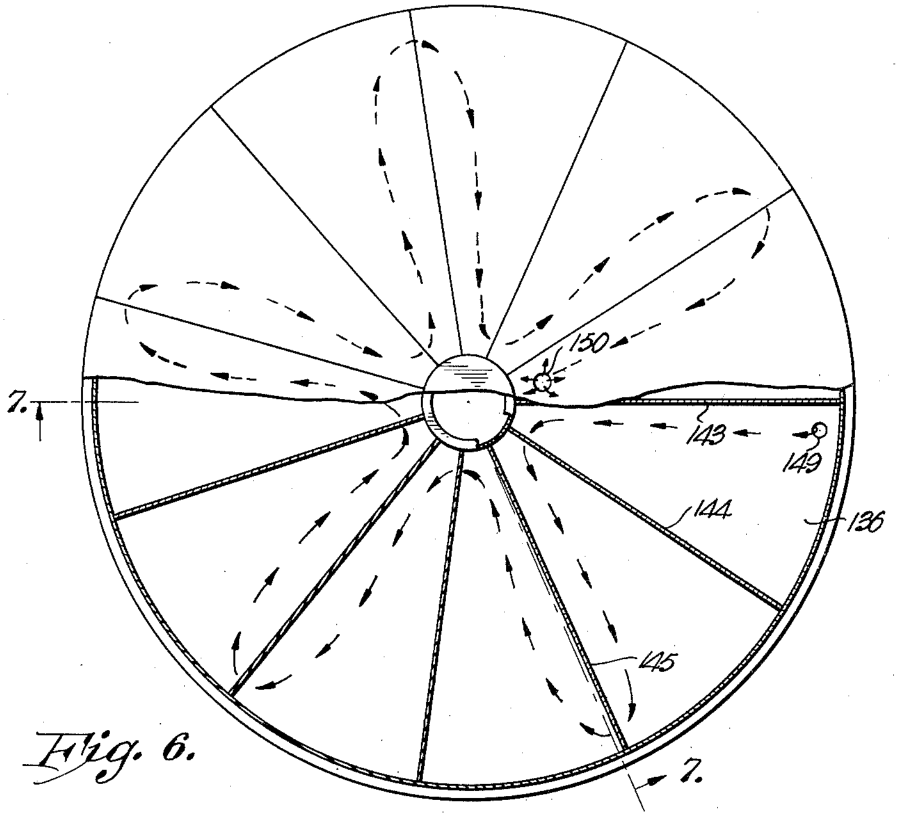
FIG. 6 is a top plan view of a modified structure according to the invention, parts being broken away for purposes of illustration.
Figure 7:
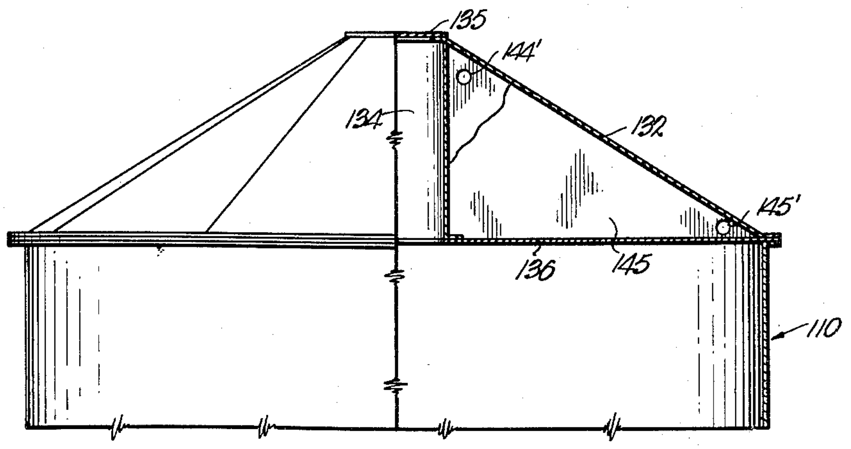
FIG. 7 is a sectional view taken generally along the line 7—7 of FIG. 6 in the direction of the arrows.

A modified form of the invention is shown in FIGS. 6 and 7. Here, in addition to providing the long and narrow passageway for the gases, the difference in density of air as opposed to that of carbon dioxide is taken advantage of to maintain a proper segregation between the gases within the tank and the air. The storage structure proper is represented at 110 and the bottom partition by reference 136. The top is shown at 132 and it will be observed that while the partition is substantially horizontal, the top is sharply pitched. Again, the filler passageway is shown at 134 and the cover therefor at 135. A continuous baffle with no apertures or openings therein is shown at 143 while there are other baffles triangular in shape radially disposed around the center and spaced from one another as in the previous embodiment. In this case, instead of spacing the baffles from the inner or outer walls, apertures are provided at opposite ends. In baffles 144 the aperture is shown by reference number 144′, while in baffles 145 it is at 145′. It will be observed that these apertures are staggered with respect to one another in successive plates, the apertures 144′ being near the center and the apertures 145′ near the outer wall. There is also, however, a difference in level of the apertures as is evident from FIG. 7.

The result is that as a gas, say carbon dioxide, enters the flow chamber through the orifice 149 in the partition 136, it does not move on to the next compartment until it rises to the level of aperture 144′. This means that at the compartment directly in connection with aperture 149 it is essentially and at all times full of the carbon dioxide. This result and arrangement is followed on around the structure with the consequence that an even clearer line of segregation is maintained between the carbon dioxide and air and a likelihood of entry of air into the main storage section is even further inhibited.

A further modification of the invention having certain similarities in function and manner of operation with the embodiments of FIGS. 1 through 7, but providing certain advantages in economies of construction and ease of assembly, as well as better control of the influx of air to the tank, is illustrated in FIGS. 8–11, inclusive.

Figure 8:
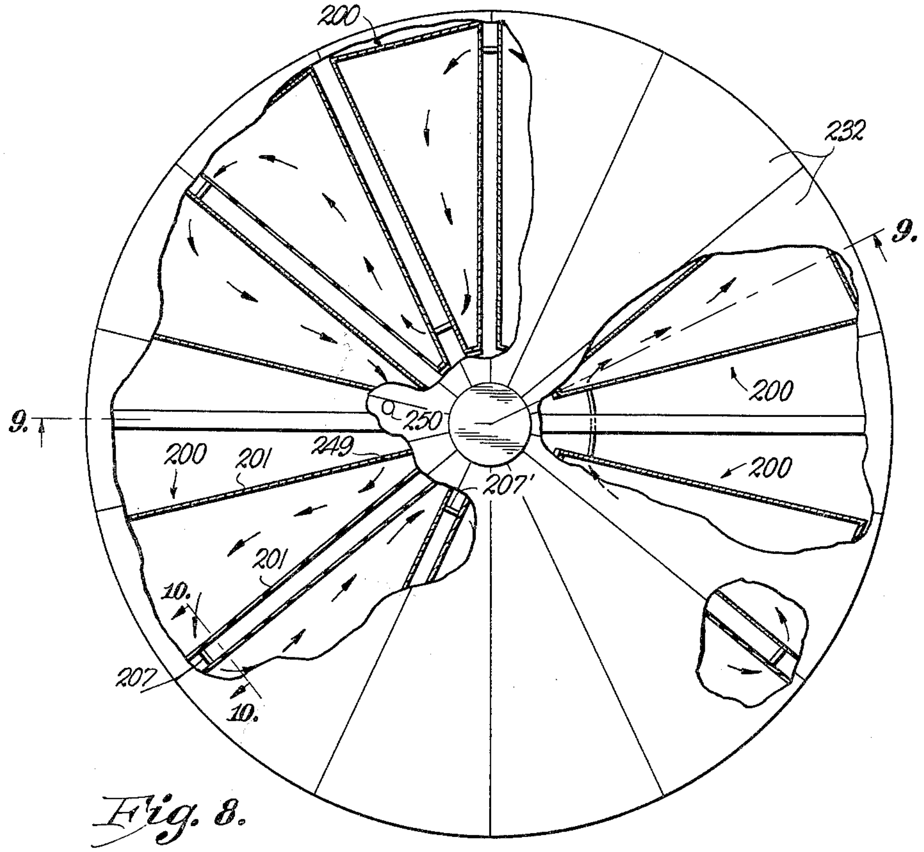
FIG. 8 is a top plan view of a modified structure embodying the invention, parts broken away and parts shown in section for purposes of illustration.

Referring to FIG. 8, the flow chambers are in this instance formed as separate compartments or box-like structures 200 supported by and depending beneath the sectored deck sections 232, the deck sections forming the top walls of the compartments. Each compartment is a parallelepiped in horizontal section, having the inwardly converging side walls 201 and parallel end walls 202. The bottom of each compartment is a sheet 203 joined to the end and side walls.

It will be noted that the side walls 201 have oppositely bent parallel upper and lower flanges 201*a* and 201*b*, respectively. The upper flange 201*a* is bolted at intervals along its length to its corresponding decking sheet 232 as by bolts 204. The lower flange 201*b* is in turn secured to the compartment bottom 203 as by bolts 205. The end walls 202 have the same cross-sectional configuration as the side walls, being provided with upper and lower flanges which connect respectively with the deck sheets 232, and compartment bottoms 203. A suitable seal in the form of gasket stripping or caulking (not shown) may be employed at all joints in order to make the compartments individually gas-tight.

The compartments are connected in series to provide a continuous flow path, the first compartment in the path having the inlet 249 near the inner end thereof adjacent the bottom sheet 203. The outlet from the first compartment is near the outer end thereof in the opposite side wall 201 (see FIG. 10) near the upper edge of the wall. The outlet is in the form of an outwardly projecting nipple 206 (see FIG. 11) received in and secured to the wall. One end of a length of flexible tubing 207 is sleeved over the nipple and leads therefrom to a similar nipple on the second compartment located near the bottom of the ladder. The outlet from the second compartment is at the inner end, and is adjacent the upper edge of its sidewall. Flow is conducted therefrom to the lower portion of the third compartment by a similar tube 207'. The connection between compartments follows the same pattern all around the structure, flow entering the compartment from the direction of the inside of the tank near the bottom of the compartment, and leaving at the top. The result is, thus, that in any given compartment, the first gas that flows back toward the interior of the tank upon inward breathing is the heavier one which stratifies in the lower portion of the compartment, and thus is the first to move toward the tank interior.

Figures 9, 10, 11:
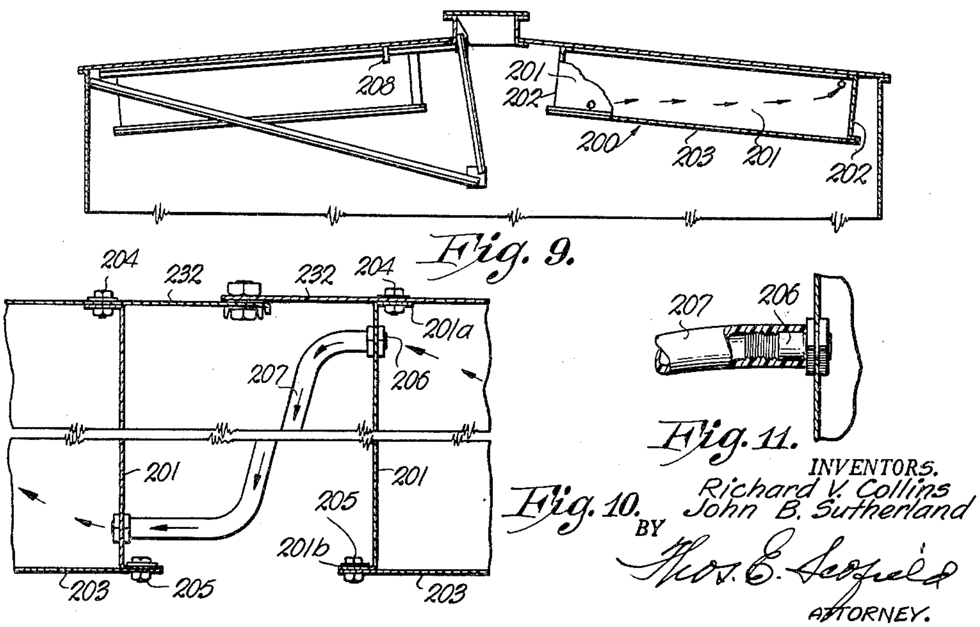
FIG. 9 is a fragmentary sectional view taken generally along the line 9—9 of FIG. 8 in the direction of the arrows.
FIG. 10 is an enlarged fragmentary section taken generally along the line 10—10 of FIG. 8 in the direction of the arrows.
FIG. 11 is an enlarged sectional detail of the nipple and tubing connection between compartments.

As shown in FIGS. 8 and 9, the last compartment in the series has its outlet connected with a tubing 208 which in turn leads to the opening 250 in the top deck of the tank.

The manner of operation of this modification is essentially the same as those previously described, with the exception that better segregation between the tank gases and air is obtained. The locating of the inlets and outlets of the individual compartments near the bottom and top of the compartment, respectively, insures that the heavier carbon dioxide or other oxygen-free gas is that which is moved back toward the interior of the tank upon contraction of the gases from the tank.

By providing the separate compartments attached and made a part of the deck sheets, erection of the tank is simplified. The compartments can be assembled with the deck sheets either at the factory or while still on the ground, and the final tube connections are all that is required to complete the assembly following erection. The compartment walls can be of extremely light metal or other material with the advantage of a great saving in weight.

It will be evident that other types of superstructure providing a continuous elongate flow path can be provided in other ways. The object of the invention is to provide the elongate conduit and the claims here appended are not intended to be limited exactly to the particular modifications of the invention as described thus far.

Figures 1B, 1C, 12, 13:
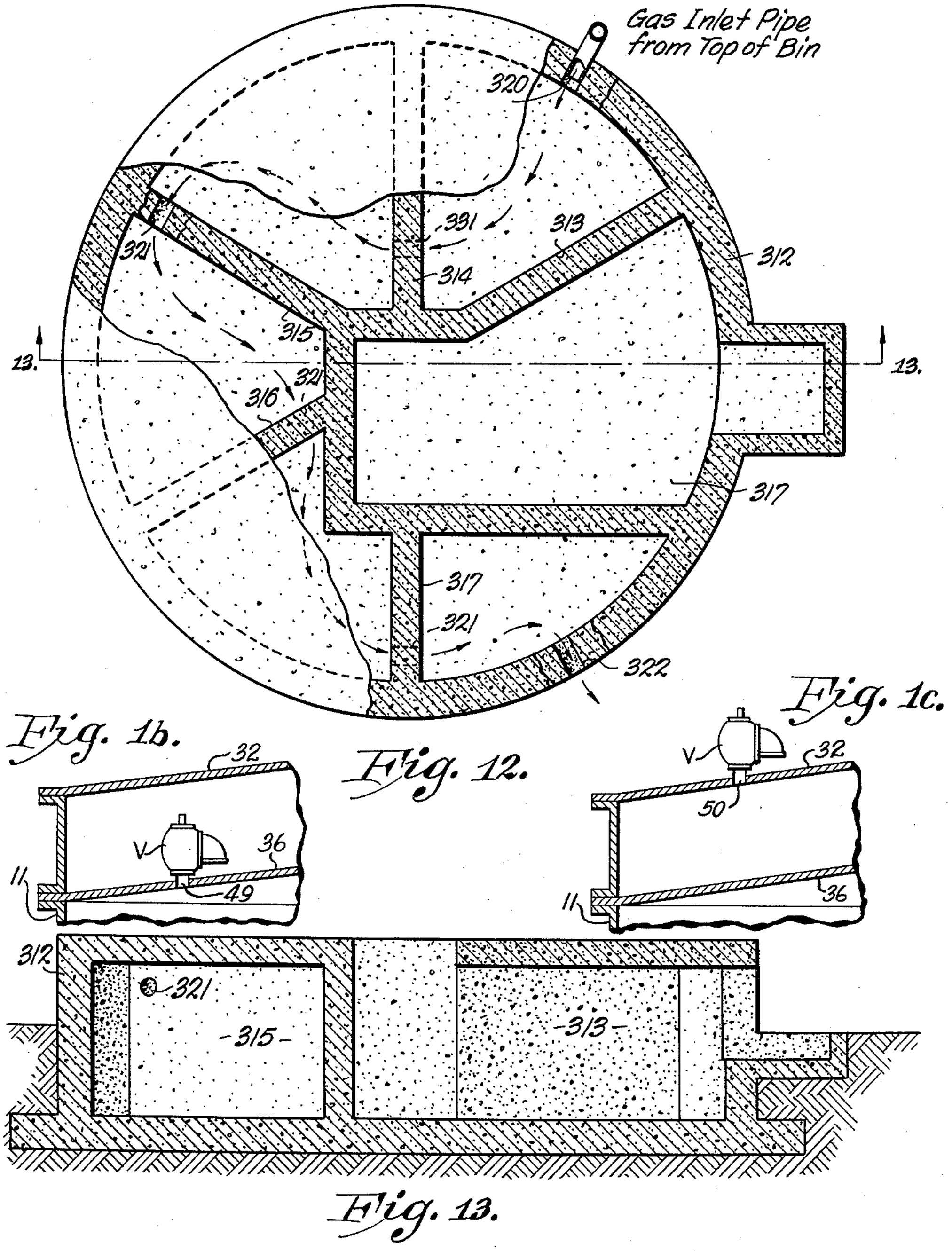
FIG. 12 is a top plan view of a foundation for the tank structure representing still another modification of the invention, parts being broken away for purposes of illustration.
FIG. 13 is a sectional view taken generally along the line 13—13 of FIG. 12 in the direction of the arrows.

It is also contemplated that the flow conduit can be incorporated in the foundation structure of the tank and a typical manner of accomplishing this is illustrated in FIGS. 12 and 13 of the drawings. As will be observed from the drawings, the foundation is a poured concrete construction having the annular ring portion 312, the auger tunnel 317 and a plurality of essentially radial partition members 313, 314, 315, 316 and 317 subdividing the space within the foundation into a plurality of compartments. As illustrated, a gas inlet pipe runs from the top of the sealed tank structure (not shown) and connects with the first of the compartments through the aperture 320. A series of apertures connecting the compartments one with another form a continuous path for the gases through the compartmented and hollow foundation structure as shown by the arrows. At the end of the passageway formed as a result of the compartments and the interconnecting apertures is an outlet 322 through which the gases can discharge to the atmosphere. As will be evident, the compartmented foundation provides the flow chamber described in the preceding embodiments, but the advantage here is that any conventional storage tank capable of being put together in a sealed construction may be utilized as the enclosure, there being no necessity for the superstructure forming a part of the earlier embodiments.

If it is desired for any reason to reduce the length and volume of the conduit, this can be accomplished by interposing a two-way pressure relief valve V in the connecting orifice or passageway between the storage section and the conduit, as illustrated in FIG. 1*b*. Such valves are conventional and known to the art, although not conventional in the location here suggested. One satisfactory type of valve is that disclosed in Patent No. 1,918,337. The effect of interposing such a valve is to prevent any displacement of gas in the flow chamber until such time as the pressure within the tank has either risen above or dropped below a preselected value, after which time the conduit will serve to function in the same way as described earlier. Of course, the addition of the valve means that it is necessary to increase somewhat the resistance of the tank to pressure leakage as positive and negative pressures will be imposed from time to time, depending on the change in atmospheric conditions. However, the conduit is not subjected to pressures in this instance, because of the location of the valve between it and the interior of the tank.

Of course, it is obvious that if desired, such a pressure relief valve V can be connected directly with the outlet from the flow chamber, as illustrated in FIG. 1*c*, with the result that there will be gas flow in the flow chamber only at such times as the pressure within the tank either exceeds or falls below the set value on the valves. Under some circumstances this may be desirable, particularly in those areas where climatic conditions change little from day to day. Under such circumstances it is possible to maintain a minimum of flow in the flow chamber.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for the storage and protection of material subject to change due to contact with the atmosphere comprising a substantially gas-tight enclosure whose outside walls are exposed to the atmosphere and provided with a breathing aperture above the level to which the enclosure is to be filled with said material and through which gas can enter and have egress from said enclosure, means providing a continuous elongate conduit connected at one end with said aperture and in communication with the atmosphere at the other end, said conduit having a total volume from one end to the other sufficient to prevent complete exhaust from either end thereof of all gases originally contained in said conduit under the pressure differentials between the inside of said enclosure and the atmosphere caused by the average changes of ambient temperatures and atmospheric pressure in the locality in which said enclosure is erected.

2. Apparatus as in claim 1 wherein the total volume of said conduit is at least 1% of the volume of enclosure.

3. Apparatus as in claim 1 wherein said aperture has interposed therein a preset pressure actuated valve actuated to open to flow in either direction upon the pressure within the enclosure reaching a preselected positive or negative value relative the ambient atmospheric pressure.

4. Apparatus as in claim 1 wherein said other end of said conduit has interposed therein a preset pressure actuated valve actuated to cause flow either into or out of the conduit upon the pressure within the conduit reaching a preselected negative or positive value relative the ambient atmospheric pressure.

5. Apparatus for the storage and protection of materials subject to change due to contact with the atmosphere comprising a substantially gas-tight vertical cylindrical metal tank having a top, a substantially gas-tight partition spaced below said top and subdividing said tank into a lower storage section and an upper gas flow chamber, a plurality of dividers mounted within said gas flow chamber and forming a plurality of flow passageways connected with one another in series thus to provide an elongate conduit, said partition having an aperture positioned to establish communication between the lower portion of said tank and one end of said conduit and said chamber having another aperture positioned to establish communication between the other end of said conduit and the ambient atmosphere whereby the interior of said storage section is separated from the atmosphere by said elongate conduit, the total volume of said conduit being sufficient to prevent complete exhaust from either end of all gases originally contained therein under pressure changes between the interior of said storage section and the atmosphere caused by the average change in climatic conditions in the area in which the apparatus is erected.

6. Apparatus as in claim 5 wherein said flow chamber is provided centrally with a filler passageway extending through said top and said partition, and including means forming a removable closure for said opening.

7. Apparatus for the storage and protection from decomposition of material subject to change due to contact with the atmosphere comprising a substantially gas-tight vertical cylindrical metal tank having a top, a substantially gas-tight partition spaced below said top and subdividing said tank into a lower storage section and an upper gas flow chamber, a filler passageway disposed centrally of and extending vertically through said top and partition, said passageway having a cylindrical wall extending between said top and partition and making the flow chamber annular, a removable closure for said filler passageway, a plurality of radially disposed upright dividers mounted within and subdividing said flow chamber, one of said dividers extending from said wall outwardly to the wall of the tank and preventing flow around the annulus more than 360°, the remaining dividers having openings alternating from adjacent the tank wall to adjacent the filler passageway wall progressively around the chamber from said one divider, a flow passageway from said storage section into said flow chamber on one side of said one divider, and a second flow passageway from said flow chamber to the atmosphere on the other side of said one divider.

8. Apparatus as in claim 7 wherein said top is conical and said partition is at a lesser pitch than said top, said dividers increasing in depth inwardly from the tank walls, said openings in said dividers alternating in level around the flow chamber.

9. Apparatus for the storage and protection of material subject to change due to contact with the atmosphere comprising a substantially gas-tight enclosure, means mounted on said enclosure and including an elongate gas flow conduit having one end in communication with the interior of the enclosure and the other in communication with the atmosphere, said conduit having a plurality of flow turns whereby flow through the conduit is other than in a straight line when pressure differentials are established between the inside of the enclosure and the atmosphere, the volume of said conduit being sufficient to prevent complete exhaust from either end thereof of all gases originally contained therein under pressure changes between the interior of said enclosure and the atmosphere caused by the average change in climatic conditions in the area in which the apparatus is erected.

10. Apparatus as in claim 9 including valve means associated with said conduit and operable to permit flow therethrough responsive to the pressure differential reaching pre-selective positive or negative values relative the atmospheric pressure.

11. Apparatus for the storage and protection from decomposition of material subject to change due to contact with the atmosphere comprising a substantially gas-tight enclosure for said material, a foundation for said enclosure, means within said foundation forming a plurality of independent gas-receiving compartments, gas communicating passageways serially connecting said compartments to form a continuous conduit open only at its ends, means connecting one end of said conduit with the interior of said enclosure to permit flow of gas into and from said conduit upon changes in pressure in said enclosure relative to the pressure in said conduit, and means connecting the other end of said conduit with the atmosphere whereby to permit flow of gas from and into the conduit at said other end to and from the atmosphere in response to the flow at said one end.

12. Apparatus for the storage and protection from decomposition of material subject to change due to contact with the atmosphere comprising a substantially gas-tight enclosure for said material, a foundation for said enclosure, means within said foundation forming an elongate gas flow conduit having one end in communication with the interior of the enclosure and the other end in communication with the atmosphere, said conduit having a plurality of flow turns whereby flow through the conduit is other than in a straight line when pressure differentials are established between the interior of the enclosure and the atmosphere, the volume of said conduit being sufficient to prevent complete exhaust from either end thereof of all gases originally contained therein under pressure changes between the interior of said enclosure and the atmosphere caused by the average change in climatic conditions in the area in which the apparatus is erected.

References Cited in the file of this patent

UNITED STATES PATENTS

| | | |
|---|---|---|
| 1,448,307 | Loop | Mar. 13, 1923 |
| 2,150,181 | Munters | Mar. 14, 1939 |
| 2,192,567 | Waugh | Mar. 5, 1940 |
| 2,305,423 | Heuser | Dec. 15, 1942 |
| 2,551,217 | Martin | May 1, 1951 |
| 2,583,062 | Riboud | Jan. 22, 1952 |
| 2,782,705 | Breidert | Feb. 26, 1957 |